United States Patent
Berg et al.

(10) Patent No.: US 11,524,643 B2
(45) Date of Patent: Dec. 13, 2022

(54) GROUND COMPACTION MACHINE, IN PARTICULAR RUBBER-TIRED ROLLER, HAVING A WHEEL COVER

(71) Applicant: BOMAG GmbH, Boppard (DE)

(72) Inventors: Christian Berg, Voelkenroth (DE);
Ernst-Josef Einolf, Boppard (DE);
Tobias Schoenberg, Oberelbert (DE)

(73) Assignee: BOMAG GMBH, Boppard (DE)

( * ) Notice: Subject to any disclaimer, the term of this patent is extended or adjusted under 35 U.S.C. 154(b) by 879 days.

(21) Appl. No.: 15/617,187

(22) Filed: Jun. 8, 2017

(65) Prior Publication Data

US 2017/0355330 A1   Dec. 14, 2017

(30) Foreign Application Priority Data

Jun. 13, 2016   (DE) .......................... 102016007162.1

(51) Int. Cl.
*E01C 19/26* (2006.01)
*B60R 19/00* (2006.01)
(Continued)

(52) U.S. Cl.
CPC ............ *B60R 19/00* (2013.01); *E01C 19/238* (2013.01); *E01C 19/26* (2013.01); *E01C 19/27* (2013.01);
(Continued)

(58) Field of Classification Search
CPC ........ E01C 19/23; E01C 19/28; E01C 19/287; B62D 25/16; B62D 25/182
See application file for complete search history.

(56) References Cited

U.S. PATENT DOCUMENTS 1,730,733 A * 10/1929 Judd .................... B62D 25/184
118/505
2,010,350 A *  8/1935 Davis .................. B62D 25/182
280/849
(Continued)

FOREIGN PATENT DOCUMENTS

CN        1231011 A    10/1999
CN      101775770 A     7/2010
(Continued)

OTHER PUBLICATIONS

BOMAG, screen grab from "BOMAG Pneumatic Tyred Rollers" video web link for video: https://www.youtube.com/watch?v=ksud8sLNP5A (Year: 2014).*

(Continued)

*Primary Examiner* — Thomas B Will
*Assistant Examiner* — Katherine J Chu
(74) *Attorney, Agent, or Firm* — Polsinelli PC

(57) ABSTRACT

Ground compaction machine, which can be a rubber-tired roller, operable to compact ground in a working direction is presented, along with a wheel cover for the same. The machine can have a machine frame and a chassis supporting the machine frame. The machine frame having a front chassis portion and a rear chassis portion. At least one of the front chassis portion or rear chassis portion has at least two chassis units, each chassis unit being rotatable about a distinct steering axis. Each chassis unit having at least one wheel, and a wheel cover, which is formed for thermal insulation of the chassis units from the external surroundings, the wheel cover comprising at least two wheel cover units, and a wheel cover unit being arranged on each chassis unit, which is configured to be rotatable about the respective distinct steering axis together with the respective chassis unit.

12 Claims, 5 Drawing Sheets

(51) Int. Cl.
*E01C 19/27* (2006.01)
*E01C 19/23* (2006.01)
*E02D 3/026* (2006.01)

(52) U.S. Cl.
CPC ........ *E02D 3/026* (2013.01); *B60R 2019/002* (2013.01)

(56) References Cited

U.S. PATENT DOCUMENTS

| | | | | | |
|---|---|---|---|---|---|
| 2,239,373 | A * | 4/1941 | Schatzman | .......... | B62D 25/184 16/257 |
| 3,119,313 | A * | 1/1964 | Heinz | .............. | E01C 19/27 404/125 |
| 3,228,312 | A * | 1/1966 | Heinz | .............. | B60K 17/34 404/125 |
| 3,543,656 | A * | 12/1970 | Roettger | ............ | E01C 19/282 404/117 |
| 3,866,943 | A * | 2/1975 | Innis | ................ | B62D 25/188 280/851 |
| 3,891,342 | A * | 6/1975 | Roe | ................. | E02D 3/032 172/547 |
| 4,157,877 | A * | 6/1979 | Lee | ................. | E01C 19/231 172/395 |
| 4,714,295 | A * | 12/1987 | Wirtgen | ............ | E01C 23/088 172/483 |
| 4,818,040 | A * | 4/1989 | Mezzancella | ...... | B60S 1/68 280/855 |
| 5,027,990 | A * | 7/1991 | Sonnenberg | ...... | B60J 11/10 224/42.2 |
| 5,494,375 | A * | 2/1996 | Yates | ............... | E01C 19/27 172/518 |
| 5,967,242 | A * | 10/1999 | Caron | ............... | E02D 3/026 172/508 |
| 5,967,554 | A * | 10/1999 | Rea | ................. | B62D 25/168 280/851 |
| 6,007,102 | A * | 12/1999 | Helmus | ............ | B62D 25/182 280/847 |
| 6,105,707 | A | 8/2000 | Tamura et al. | | |
| 6,171,020 | B1 | 1/2001 | Pikna et al. | | |
| 6,206,611 | B1 * | 3/2001 | Schreck | ............ | E02D 3/026 180/20 |
| 6,457,903 | B1 | 10/2002 | Dufty | | |
| 7,163,354 | B2 * | 1/2007 | Runestad | .......... | E02D 3/026 172/606 |
| 7,793,985 | B1 * | 9/2010 | Coloma | ............ | B62D 25/168 280/848 |
| 7,997,640 | B1 * | 8/2011 | Wurm | ............... | B62D 25/186 280/849 |
| 8,714,869 | B1 * | 5/2014 | Ries | ................. | E01C 19/27 219/202 |
| 8,821,065 | B2 * | 9/2014 | Ugru | ............... | E02D 3/026 172/537 |
| 8,858,177 | B2 * | 10/2014 | Janssen | ............ | F03D 3/068 416/104 |
| 9,630,657 | B2 * | 4/2017 | Ries | ................. | B62D 25/163 |
| 2002/0044829 | A1 | 4/2002 | Rickards | | |
| 2008/0292401 | A1 * | 11/2008 | Potts | ................ | E01C 19/238 404/95 |
| 2011/0304129 | A1 * | 12/2011 | Owens | ............. | B62D 25/16 280/849 |
| 2013/0096781 | A1 * | 4/2013 | Reichenbach | ...... | B60Q 1/326 701/49 |

FOREIGN PATENT DOCUMENTS

| | | |
|---|---|---|
| CN | 203222722 U | 10/2013 |
| EP | 0864694 A2 | 9/1998 |
| FR | 1464849 A | 1/1967 |
| JP | 2000336609 A | 12/2000 |

OTHER PUBLICATIONS

Screen grab from "AF2903 Road Construction and Maintenance Compaction of Hot Mix Asphalt" PowerPoint presentation, slide 10/32 web link for PowerPoint presentation: https://www.slideserve.com/adlai/af2903-road-construction-and-maintenance-compaction-of-hot-mix-asphalt (Year: 2014).*
English description of CN1231011; retrieved from www.espacenet.com on May 3, 2022.
English abstract of CN101775770; retrieved from www.espacenet.com on May 3, 2022.
English abstract of CN203222722; retrieved from www.espacenet.com on May 3, 2022.
English abstract of JP2000336609; retrieved from www.espacenet.com on May 3, 2022.
English description of FR1464849; retrieved from https://patents.google.com/patent/FR1464849A/en?oq=FR1464849 on May 4, 2022.

* cited by examiner

GROUND COMPACTION MACHINE, IN PARTICULAR RUBBER-TIRED ROLLER, HAVING A WHEEL COVER

CROSS REFERENCE TO RELATED APPLICATIONS

This application claims the priority of German Application DE 102016007132.1, filed Jun. 13, 2016, which is hereby incorporated by reference in its entirety.

FIELD

The invention relates to a ground compaction machine, in particular a rubber-tired roller, for compacting a ground in a working direction. Furthermore, the invention relates to a wheel cover for use on a ground compaction machine.

BACKGROUND

Generic ground compaction machines are used in road and pathway construction, for example, where they are to compact the ground and strengthen it before a base layer, for example an asphalt cover, is laid. Just as well, the base layers laid on the compacted ground will be compacted and thus strengthened by means of generic ground compaction machines. Various ground compaction machines, for example rollers, tandem rollers or rubber-tired rollers are known for different applications. Generic ground compaction machines comprise a machine frame and a chassis supporting the machine frame, the chassis including a front chassis portion and a rear chassis portion. These chassis portions may be the front and rear drums of a tandem roller, for example. In the case of a rubber-tired roller, the chassis portions located at the front and the rear in the working direction include elastic tires, for example rubber tires, via which the weight of the rubber-tired roller is transmitted to the ground, resulting in a compaction there. The elastic properties of the tires of the rubber-tired roller result in advantageous kneading or flexing effects, which is why rubber-tired rollers achieve a particularly homogenous compaction of the ground and a closure of the pores or sealing of the surface. In particular, the invention relates to a ground compaction machine of the rubber-tired roller type. A generic rubber-tired roller is known, for example, from the applicant's model BW 25 RH.

In order to leave a most smooth surface after a passage by the rubber-tired roller, is important that ground material will not stick or adhere to the wheels of the rubber-tired and will not be torn away from the ground and be pressed into the ground in another place. Adhesion of ground material to the tires is therefore to be prevented as far as possible or at least to be minimized. It is known that the adhesion of ground material to the tires of a rubber-tired roller depends on the temperature of the tires in that less ground material to hotter tires. During operation of the rubber-tired roller, the tires are heated by the deformation energy of their elastic material as well as by the still hot asphalt layers, which being compacted. To support the heating of the tires and prevent a rapid cooling as far as possible, it is known from the prior art to mount thermally insulating suspensions to the rubber-tired rollers, which hang down from the machine frame and almost reach the ground, whereby the tires are protected from heat loss to a certain extent.

However, these thermally insulating suspensions are a problem in rubber-tired rollers having a steered and oscillating steering axle of a chassis portion. Herein, a chassis portion relates to the group of the front (front chassis portion) or the rear (rear chassis travel units, in particular rubber tires or rubber wheels. The travel units can be operated in groups. In the present context, these groups will be referred to as chassis units. A chassis portion including a total of four individual tires, for example the front chassis portion, may for example include two chassis units, each having two rubber tires. In the concerned rubber tired-rollers, at least one chassis portion comprises at least two chassis units, each chassis unit being turnable about a distinct, typically vertical, steering axis and being adjustable a typically horizontal pendulum axis and comprising at least one tire. Alternatively or additionally, it is also possible to provide a common, typically horizontal pendulum axis for all chassis units of a chassis portion. For example, the front chassis portion comprises four tires, with in each case one pair of tires being commonly rotatable about a steering axis and adjustable about a pendulum axis. Thus, if the rubber-tired roller is to turn a corner, a movement of the two chassis units about their respective distinct steering axes is required, respectively. In order to provide a rubber-tired roller having this type of steering mechanism with a wheel cover configured for thermal insulation of the chassis units from the usually a very large wheel cover, which is fixed to the machine frame, is used to not limit the required movement space of the chassis units, the wheel cover covering all tires of a chassis unit at the same time and also in different steering positions. As used herein, thermal is to be understood in that a device is created that prevents or slows a cooling of the rubber tires caused by the cooler surroundings. In order to account for the space required by the in a steering action, in other words, a space is to be surrounded by the wheel covers that considers all positions of all wheels in all steering positions. The wheel cover, which will be quite protruding, results in an enlargement of the overall measures of the ground compaction machine, which will be disadvantageous for maneuvering the ground compaction machine for its transport, for example on a truck. Furthermore, precise steering of the ground compaction machine by the operator is complicated, since the operator does not have an unobstructed view of the wheel edges of the rubber-tired roller due to the projecting cover. named problems particularly occur in rubber-tired rollers having this type of steering mechanism, in which at least two chassis units are present on at least one chassis portion, each chassis unit having a distinct steering axis. A rubber-tired roller of this type is known EP 0 864 694 A2, for example.

SUMMARY

The object of the present invention thus is to provide a ground compaction machine, in particular a rubber-tired roller, which has an improved wheel cover for thermal insulation of the chassis units from the external surroundings. In particular, the heat loss of the wheels to the surroundings is to be reduced and, at the same time, a better handling of the machine is to be ensured.

The object is achieved by means of a ground compaction machine and a wheel cover according to the independent claims. Preferred embodiments are indicated in the dependent claims.

Specifically, in a ground compaction machine mentioned above, in particular a rubber-tired roller, the object is achieved in that the wheel cover includes at least two wheel cover units, one wheel cover unit being arranged on each chassis unit, the wheel cover units being rotatable about the respective distinct steering axis together with the respective unit. In other words, each chassis unit comprises a distinct wheel cover unit, which is configured to be steered along together with the respective chassis unit, in particular in a synchronous manner or about the same steering axis. The wheel cover units of all chassis units of a respective chassis portion together form the wheel cover of the chassis portion. Thus, in contrast to the solutions known from the prior art, the wheel cover is not mounted to the machine frame and does not cover the respective chassis portion from the machine in a rigid manner, but, according to the invention, is subdivided into individual modules, the wheel cover units, which are directly mounted to the chassis units and which move with them during their steering movements. Thus, the wheel cover units are in each case formed in such a way that they enclose the at least one wheel of the respective chassis unit least partially in such a way that the at least one wheel is thermally insulated from the surroundings by the wheel cover unit. As the wheel cover units are in each case fixed to the moveable portion of a chassis unit, further preferably, a co-movement of both the wheel units in pendulum movements of the chassis units about a distinct pendulum axis and of the respective chassis portion about a common central pendulum axis is effected in addition to co-movement of the wheel cover units in steering actions.

Due to the inventive co-steering configuration of the wheel cover or the at least two wheel cover units, and in particular their subdivision into in each case one wheel cover unit per chassis unit, it is possible to design the individual wheel cover units and thus the entire wheel cover significantly smaller and more compact than a wheel cover unit known from the prior art, which surrounds the entire chassis portion in a more or less rigid manner and also has to include space for steering movements of the chassis units. Furthermore, it is possible that the wheel cover units also follow pendulum movements of the chassis units and the chassis portions together with the rubber tires. The wheel cover units according to the invention surround the wheels or the chassis units in a considerably closer manner than existing wheel covers. As a result, on the one hand, thermal insulation of the wheels from the external surroundings is improved, whereby less heat of the wheels is lost, for example by convection caused by draft. As a result, the heating of the wheels is accelerated at the start of a working process and reduces the adhesion of material to the tires. Moreover, the smaller design of the wheel cover enables the operator of the ground compaction machine to look significantly closer to the edges of the wheels, which simplifies the operation of the ground compaction machine and in particular precise steering along a predetermined lane. Moreover, maneuvering and transport of the ground compaction machine from one construction site to the other, for example on a truck, is easier due to the small size of the wheel cover according to the present invention.

According to the invention, the at least two wheel cover units of the front and rear chassis portions form the wheel cover, wherein it may also be provided that in each case one wheel cover according to the invention is provided for the front and rear chassis portions. In order to minimize the heat loss of the wheels toward the external surroundings as far as possible, it is advantageous when the chassis units are substantially completely surrounded toward the external surroundings. At the same time, it is advantageous to keep the wheel as small as possible and to keep the thermal insulation space as small as possible. Furthermore, in wheel cover units according to the invention that have a co-steering configuration, it is a fact that these units are rotated toward one another depending on the amount of steering action of the ground compaction machine and change their relative to one another. As a result, an interspace or a gap between the individual wheel cover units may open between two chassis units, through which air from the external surroundings, for example draft, may reach the wheels. Since the ground compaction machine mostly travels straight lines during working operation, the wheel cover should be configured in such a way that the thermal insulation of the chassis units is as large as possible when the chassis units are in the position of straight-line motion.

It is thus preferred that the wheel cover units are formed in such a way that they substantially completely surround all chassis units toward the external surroundings when ground compaction machine is in straight-line motion, in particular together with the machine frame. In this way, it is ensured that a maximum thermal insulation is provided in the predominant operating mode of the ground compaction machine. The thermal insulation of chassis units or of the wheels can not only be effected by the wheel cover, but also by parts the machine frame of the ground compaction machine, which surrounds the chassis units or the wheels particularly in the region in the working direction behind the chassis units and vertically above the chassis units. Vertically above the chassis units describes the side of the chassis units that face away from the ground to be compacted in the working mode. In these regions, the machine frame of the ground compaction machine is so close to the chassis that the machine frame also prevents that excessive thermal energy is lost from the chassis units or wheels to the exterior surroundings. Thus, in a preferred embodiment of the the chassis units are substantially completely insulated or surrounded from the external surroundings by the wheel cover, and in particular also by the machine frame, when the compaction machine travels in straight-line motion. The fact that interspaces will develop between the wheel cover units due to the steering movement when the machine corners is accepted in this embodiment, since corning accounts for only a fraction of the operating time the ground compaction machine. In this way, a particularly simple wheel cover can be used, the dimensions and production costs of which are particularly small. As an alternative, it can also be provided that a storage element, for example an in particular flexible curtain, is provided, via which the free space developing due to the steering action (interspace between the wheel covers) can be closed in addition to the wheel covers.

The configuration of the wheel cover according to the invention varies depending on how many chassis units are included by the chassis portion. Typically, generic rubber-rollers include at least and in particular exactly two chassis units, each having two wheels, at their front chassis portion. In such a rubber-tired roller, the respective wheel cover unit of the two chassis units can be formed identically, i.e., mirror-symmetrically. In this embodiment, in which the chassis portion includes in particular exactly two chassis units, each having one wheel cover unit, it is preferred that each wheel cover unit comprises a front skirt, a hood and lateral skirt. As used herein, the front skirt refers to the portion of the wheel cover unit which located essentially in front of the chassis unit or the at least one wheel in the working and causes a thermal insulation in this region. The lateral skirt refers to the part of a wheel cover unit which is located transversely to the working direction externally on the wheel cover unit or the chassis unit and which is in particular not adjoined by any further chassis unit or wheel cover unit. Thus, the lateral skirts are arranged essentially parallel to the longitudinal axis or to the working direction of the ground compaction machine. The hood describes the part of the wheel cover unit which is arranged essentially vertically above the chassis unit or the at least one wheel and/or behind the chassis unit or the at least one wheel in the working direction. The hood particularly extends from the region located vertically above the chassis unit or from the side of the chassis unit facing away from the ground to the region behind the chassis unit in the working direction of the ground compaction machine. Ideally, the hood is further configured to be adjustable from a cover position, in which it covers the at least one rubber tire, to an open position. Thus, depending on the demand, a sight area can be introduced in the wheel cover unit by opening the hood, in order to enable a view on the tires, which can be advantageous for inspection purposes or for observing processes in the working mode, in particular in order to be able to check material adhesion of the rubber tires. Usually, losses occurring in the heat insulation can be neglected. Additionally or alternatively, sight flap adjustable between a cover position and an open position may be provided in the hood, so that not the entire hood but merely the smaller sight flap is opened, whereby insulation losses can be minimized. Furthermore, suitable fastening means are preferably provided, in which the hood and/or the sight flap can be secured in the cover position and/or the open position, in order to enable reliable positioning. According to an alternative embodiment, the hood may be designed at least partially transparent in order to enable view on the wheels from the outside. The above statements also apply to the rear chassis portion analogously, except for the fact that a rear skirt is provided instead of the front skirt, accordingly. Thus, the following explanations regarding the front skirt refer to variants of the rear skirt just as well.

In embodiments in which at least one chassis portion includes three or more chassis units, the chassis units arranged at the periphery viewed transversely to the working direction each have like or mirror-symmetrical wheel cover units, while the chassis units arranged between these chassis units comprise other wheel cover units. Thus, these additional wheel cover units may comprise wheel cover units comprising a front skirt/rear skirt and in particular a hood, for example. In contrast, a lateral skirt is not required on these wheel cover units, but may also be provided.

The front skirt/rear skirt, the hood and the lateral skirt are those parts of the wheel cover which substantially account for a heat insulation from the external surroundings. Thus, preferably, they are made of a thermally insulating material, for example plastic or rubber. For example, they are flexible mats, which can be suspended on the chassis units. Thus, it is advantageous that the front skirt/rear skirt and/or the lateral skirt and/or the hood can be rolled, for example. In this case, the thermal insulation of the chassis units by the wheel cover can be suppressed in applications, in which these units are not required, by rolling and, in the rolled state, securing the front skirt and/or the lateral skirt and/or the hood. At the same time, in this working mode, the operator may take an unobstructed view on the wheels and operate the ground compaction machine in a particularly precise manner. A particularly tight configuration of the wheel cover and thus a particularly advantageous thermal insulation can be achieved when the front skirt and/or the lateral skirt and/or the hood according to a preferred embodiment of the invention are together formed as one integral piece. In this way, the interspaces between the individual parts are avoided, which reduces the exchange of air between the external surroundings and the chassis units.

In order to further improve the thermal insulation of the individual chassis units the external surroundings, interspaces or gaps between individual wheel cover units must be avoided as far as possible. To that end, it is advantageous when the wheel cover units, in particular on the front skirts, each comprise at least one sealing element, which is configured such a way that it rests against, and/or overlaps with, a sealing element of an adjacent wheel cover unit when the ground compaction machine is in straight-line motion, so that an interspace between two adjacent wheel cover units is closed. In particular, the sealing elements are formed to be elastic. The sealing elements can be sealing lips, for example, which unite the front skirts of the wheel cover units, in particular in the region facing each into a uniform, closed cover when the ground compaction machine is in straight-line motion, example by a partial overlap. As an alternative, the sealing elements may also comprise finger-like elements and/or for example a brush. For example, the brushes of two adjacent wheel cover units may overlap one another and ensure a closure of the interspace between two wheel cover units or their front skirts. In this way, a particularly simple closure of the interspace between two wheel cover units can be achieved at least when the ground compaction machine is in straight-line motion.

While cornering, due to the respective steering of the chassis units, and thus due to the respective rotation in the same direction of the wheel cover units to one another, the wheel cover units move away from one another in such a way that, for example, the front skirts of the wheel cover units are offset from one another and thus do no longer form a uniform cover. An empty space or an interspace is formed between the individual chassis units, through which air from the external surroundings gets into contact with the at least one wheel of the chassis units. In order to keep the air exchange of the chassis units with the external surroundings and the concomitant heat loss by convection as low as possible, it is now preferred that the sealing elements are formed in such a way that, while cornering, at least one sealing element located in the interspace between two neighboring wheel cover units slides along or rests against a wheel, in particular on its face side, of the neighboring chassis unit and/or an edge of the neighboring wheel cover unit, or at least protrudes to the close proximity thereof. In other words, the sealing element ensures that there is a closing between the front skirt of a particular wheel cover unit and for example the at least one wheel of the neighboring chassis unit while cornering, and that this closing is maintained while cornering. This closing prevents that draft from the external surroundings gets into the entire region of the chassis units in an unobstructed fashion, leading to an increased heat loss there. According to the preferred embodiment, the interspace between the front skirt of the wheel cover unit and the at least one wheel of the neighboring sealing element is bridged over and in particular sealed.

In addition or as an alternative to such an at least temporary bridging of the interspace by the sealing element, the wheel cover according to the invention could also be formed in such a way that each wheel cover unit per se surrounds or insulates the chassis on which it is arranged even in those regions where a further chassis unit and/or the machine frame of the ground compaction machine bounders. Thus, it is possible, for example, that the wheel cover units each comprise an additional lateral skirt on the sides facing one another, such that each wheel cover unit, in particular together with the machine frame, substantially completely surrounds a chassis unit toward the external surroundings. Thus, each chassis comprises a distinct thermal encapsulation, which in each case follow the steering actions. In particular, all wheel cover units of all chassis units of the ground compaction machine according to this exemplary embodiment are configured identically or mirror-symmetrically. example, each wheel cover unit may comprise one front skirt, two opposite lateral skirts, are spaced from one another transversely to the working direction, and in particular also one hood. Due to the fact that each chassis unit comprises in each case one lateral skirt on its located at the periphery viewed transversely to the working direction, it is avoided that an interspace between the front skirts develops while cornering. Even in working conditions that include frequent or long-term corning, a reliable heat insulation of the chassis units can be ensured in this way.

Due to the above described steering of the ground compaction machine with at least two chassis units per chassis portion, each chassis unit includes a distinct support device, in particular a support column, which connects the chassis unit with the machine frame of the ground compaction machine. The steering axis of the respective chassis unit typically runs through the support column and is realized by a corresponding rotary joint, for example. The wheel cover according to the invention is adapted to the use of such chassis units. A configuration, in which the wheel cover units each comprise a recess, in particular in the hood, through which a support column of the chassis unit is connected with the machine frame, is particularly preferred. For example, the wheel cover unit can be configured in such a way that it terminates flush with the support column of the chassis unit and rests against the support column in a close, in particular air-tight, manner, so that a heat loss of the chassis unit or the wheels via the recess is prevented.

Theoretically, the wheel cover unit per se can be configured in a rigid manner. To that end, hood-like embodiments made, for example, of plastic or metal, may be considered. However, in practice, a flexible wheel cover or flexible wheel cover units have proven advantageous, for example of flexible plastic and/or rubber mats. In this case, a suspension provided on the chassis units, in particular in the type of a holding frame, via which the mats the wheel cover units can be fixed. In a preferred embodiment, the wheel cover units thus include a mounting frame, which is arranged on the chassis units, and to which the front skirt, the hood and the lateral skirt can be fixed. The mounting frame forms a frame or a rack, on which those parts of the wheel cover unit can be mounted or suspended which ensure the thermal insulation of the chassis units from the external surroundings. To that end, the frame may include rigid holding rods, on which the flexible covering mats are mounted subsequently. Here, the mounting frame in particular sets the distance of the individual parts the wheel cover unit to the at least one wheel or the chassis unit. Thus, it influences the of air located below the wheel cover, whereby it has direct influence on the heat loss of the at least one wheel. Preferably, the mounting frame is configured to be detachable from the chassis unit, for example in such a way that the mounting frame can be fixed to the chassis and also be removed therefrom via a quick fastener. In this way, the mounting frame and the wheel cover can be easily removed from the ground compaction machine when a wheel cover is not required. Furthermore, such a configuration of the mounting frame or of the cover allows to optionally retrofit the wheel cover according to the invention. The mounting frame comprises fastening means, by means of which the front skirt, the hood and the lateral skirt can be fastened to the mounting frame. This can be ropes or eyes, for example, wherein the ropes can be guided through corresponding eyes on the front skirt, the hood and/or the lateral skirt in such a way that they are fastened to the mounting frame.

The essential factor of the invention is that the wheel cover units are designed to be co-steering, i.e., steer along with the wheels. The specific fastening of the wheel cover units is thus ideally effected on a part or region of the machine that moves due to the steering movement. In particular, this is the support structure of the wheels toward the machine frame or the wheel or wheel pair per se or the structures connecting the wheels of a wheel pair. The specific fastening of the wheel cover units and in particular of the mounting frame is further preferably effected via releasable connections, in order to be able to mount or dismount the wheel cover units as required. To that end, suitable fastening means can be used, for example threaded connections. However, in order to allow a fast mounting and/or dismounting, additionally or alternatively form-fit connections, which are releasable without tools, very particularly a clamping and/or latching connection, for example connections via clamping springs, holding rails etc., can be used.

If, despite all counter measures, ground material sticks to the wheel of the ground compaction machine, it is common to provide stripping devices on the chassis units, which in particular remove ground material adhering to the running surface from the wheels. According to a preferred embodiment, in order to further simplify the structure of the ground compaction machine, it is provided for the wheel cover units to comprise in each case one stripping device configured to strip-off ground material adhering to the at least one wheel of the chassis unit. Thus, the stripping device is arranged on the wheel cover unit and in particular on the mounting frame. Due to the fact that the wheel cover unit and the stripping device are formed together, further installation space can be dispensed with. As an alternative or in addition, the mounting frame can also be used as a support structure for further elements. These may include additional components, such as brushes or coco mats, for example. It is also possible to attach parts of a sprinkling device, such as spraying beams or individual nozzles to the mounting frame, achieving in particular a closed design of the wheel cover units even when using said additional components.

Basically, it would be possible for each chassis unit of the rubber-tired roller to comprise exactly one wheel, exactly three wheels or even more wheels. It was found, however, that the invention can be implemented particularly advantageously if each chassis unit comprises exactly two wheels. This way, both thermal insulation of the chassis units and the further advantages of the compact dimensioning of the wheel cover according to the invention can be fully exploited.

The above object is also achieved by means of a wheel cover for use on a ground compaction machine, the wheel cover being configured according to the above-mentioned embodiments. In order to avoid repetitions, reference is made to the above statements with respect to the configuration of the wheel cover. According to that, the wheel cover is in particular characterized by one or more of the following features:

- it includes a mounting frame, in particular for connection to a chassis unit;
- it includes a front skirt, a hood, and at least one and in particular exactly one lateral skirt;
- it is formed to be open on the side opposite the exactly one lateral skirt,
- the front skirt and/or the lateral skirt and/or the hood together are formed as one piece, in particular of a flexible material, it comprises at least one sealing element, in particular on the face side opposite the lateral skirt;

it comprises a holding device, by means of which it can be fixed to the ground compaction machine, in particular on a chassis unit;

it comprises a recess for guiding a support column therethrough.

BRIEF DESCRIPTION OF THE FIGURES

Hereinafter, the invention is explained in further detail by means of the exemplary embodiments shown in the figures. In the schematic figures.

Like or equivalent components are denoted by like reference numerals throughout the figures. Repeating components are not necessarily denoted separately in each figure.

DETAILED DESCRIPTION

Figure 1:
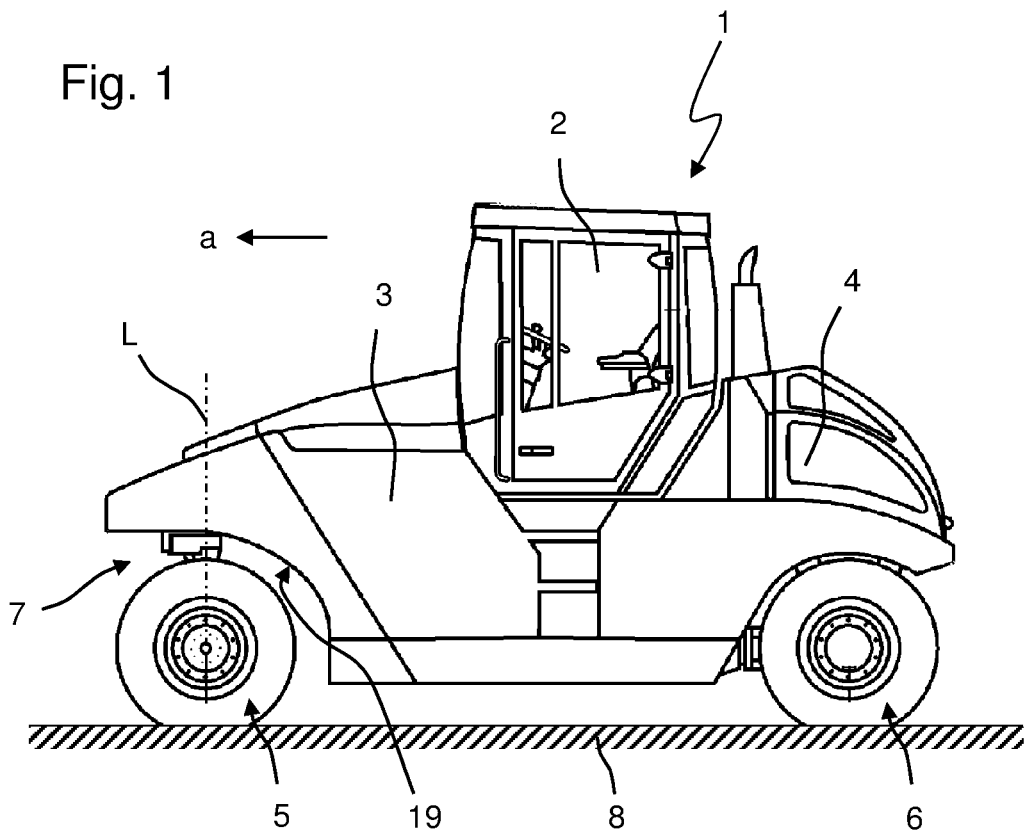
FIG. 1 shows a side view of a ground compaction machine.
Figure 2:
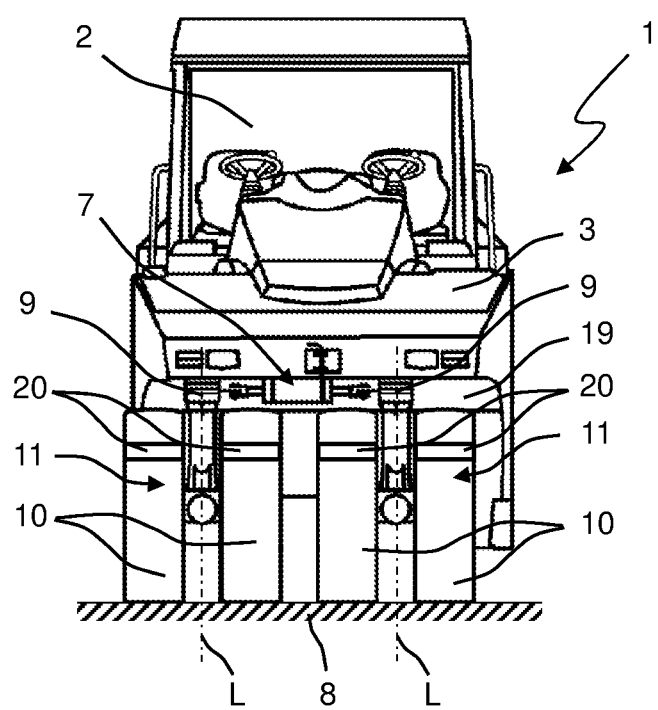
FIG. 2 shows a front view of the ground compaction machine of FIG. 1.

FIGS. 1 and 2 show a generic ground compaction machine 1 having an operator platform 2 and a machine frame 3. Furthermore, the ground compaction machine 1 comprises a chassis driven by a propulsion unit 4, mostly a diesel combustion engine, which in the exemplary embodiment shown comprises a front chassis portion 5 and a rear chassis portion 6. During working operation of the ground compaction machine 1, said machine moves in working direction a over the ground 8 and compacts it. FIG. 2 shows details of the front chassis portion 5. The front chassis portion 5 comprises a steering device 7 and two chassis units 11. The chassis units 11 each comprise two wheels 10 and a steerable support column 9. The chassis units 11 are each designed to be rotatable about vertical steering axes L running in parallel to one another for steering the ground compaction machine 1. Furthermore, each wheel 10 has an assigned stripping device 20. As mentioned above, it is advantageous in the working mode of the machine if the wheels 10 are thermally insulated from the external environment.

Figure 3:
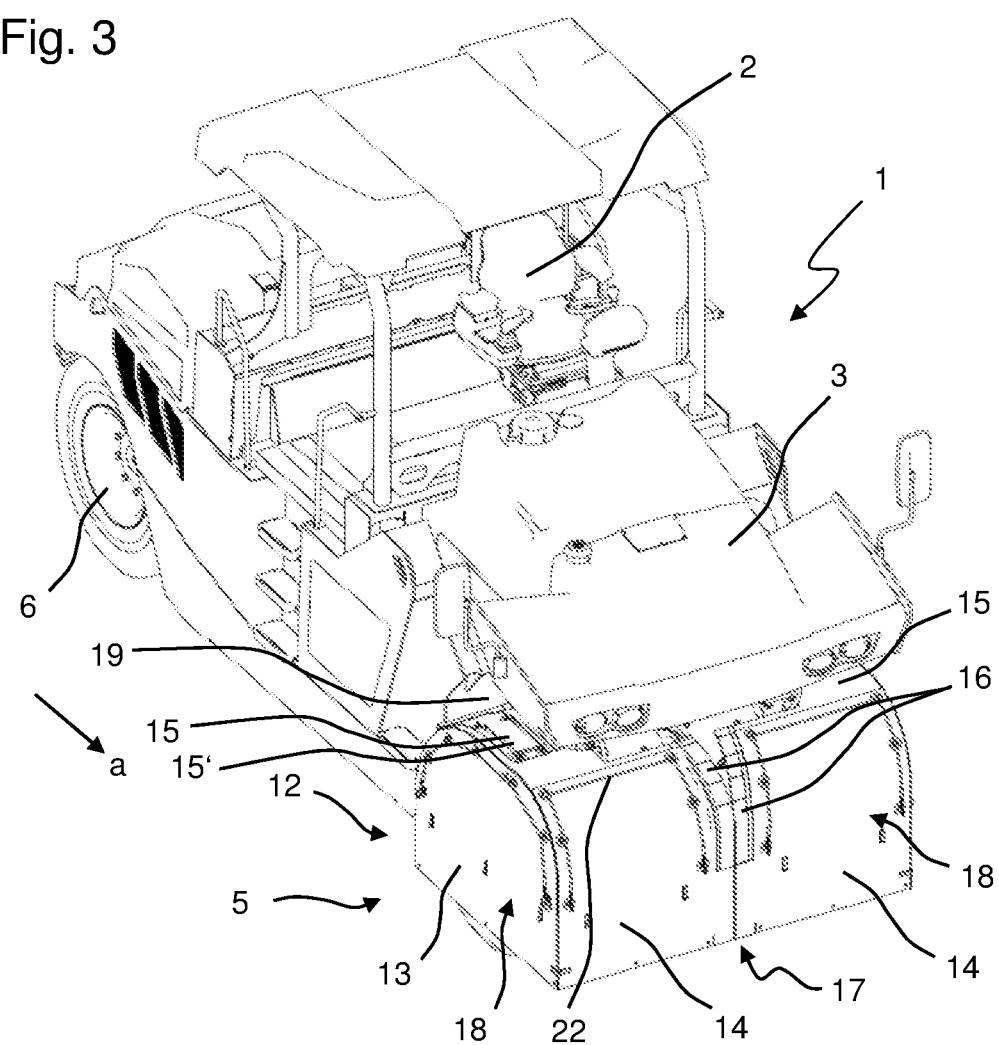
FIG. 3 is a perspective view of a ground compaction machine when in straight-line motion with wheel cover unit.
Figure 4:
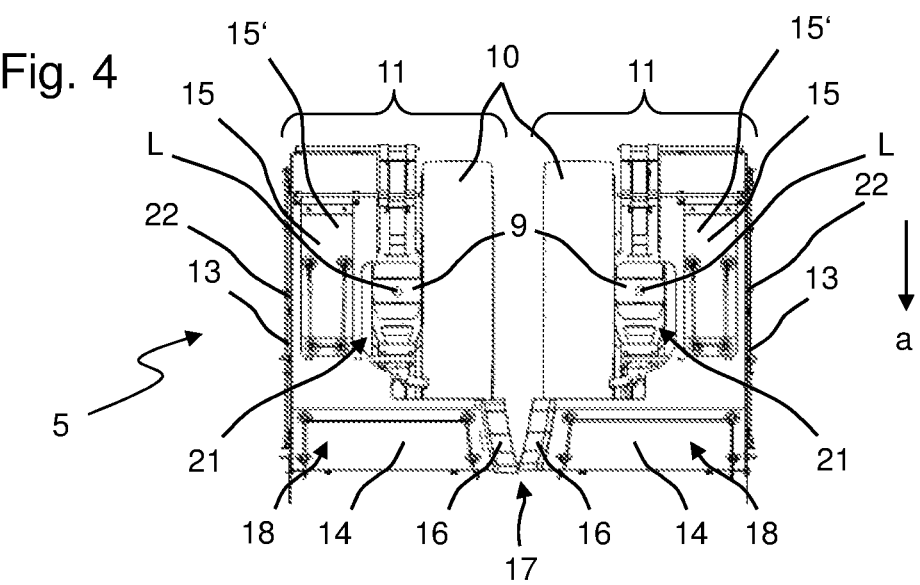
FIG. 4 is a top view of the front chassis portion of the ground compaction machine according to FIG. 3.

In order to achieve this, a wheel cover 12 according to the invention is provided, illustrated in FIGS. 3 to 10. FIGS. 3 and 4 show the ground compaction machine, respectively front chassis portion 5 with the wheel cover 12 during straight-line motion. The wheel cover comprises a wheel cover unit 18 for each chassis unit 11. In the exemplary embodiment shown, a wheel cover 12 thus consists of two wheel cover units 18, with in each case one wheel cover unit 18 assigned to one chassis unit 11. Each wheel cover unit 18 of each unit 11 comprises a lateral skirt 13, a front skirt 14 and a hood 15. Said cover units are in case configured as rubber mats, which are arranged on a mounting frame 22 and, via said mounting frame 22, are arranged on the support column 9 of its respective chassis unit 11 or the mobile/ steerable wheel axis of the respective chassis unit 11. In the embodiment shown, the lateral skirt 15, front skirt 14 and the hood 15 are configured as separate mats, but they could instead also be formed as one integral piece.

As illustrated, the wheel cover 12 encloses the chassis units 11 in each case in the working direction a and in particular transversely to the working direction a to the outside or the external environment, respectively. Enclosing the chassis unit 11 in working direction a is effected by the front skirt 14, while lateral enclosing is effected by the lateral skirt 13. Furthermore, the wheel cover unit 18 also comprises the hood 15, which at least partially encloses the chassis units 11 vertically upward and also extends into the region in the working direction a behind the chassis units 11 or wheels 10, respectively. A sight flap 15' is part of the hood 15. Specifically, said sight flap is some sort of rag element which can be unfolded separately from the remaining covering elements of the wheel cover unit 18 from the cover position shown in the figures, in which it covers part of an insulating space around the respective chassis unit 11 to the outside, into an open position. Thereby, an opening directed obliquely upwards is achieved in the wheel cover unit 18, allowing a view on the wheels 10 from outside the wheel cover unit 18. This can be helpful for inspection purposes. Furthermore, the sight flap 15' is arranged eccentrically on the region offset toward the outer side of the ground compaction machine 1, in order to allow a view from the operating platform through the sight channel, which is provided in the form of a recess arranged laterally in the machine frame.

As can be taken from FIG. 4, for example, the wheel cover 12 does not completely enclose the front chassis portion 5, but in particular saves regions vertically upwards and in the working direction a to the rear in the region between the two chassis units 11. In other words, the wheel cover unit 18 does not completely enclose the chassis units 11 in those regions which either adjoin another chassis unit 11 and/or the machine frame 3, in particular a wheel side 19 of the machine frame 3. For example, the wheel side 19 refers to the wheel case, which at least partially encloses the chassis units 11 and also separates them from the external environment and thermally insulates them. The illustration of FIG. 3 particularly shows that despite this incomplete housing by the wheel cover 12 a complete thermal insulation of the front chassis portion 5 from the external environment is achieved, as the wheel cover 12 essentially completely encloses the front chassis portion 5 together with the machine frame 3 or in particular with the wheel side 19 of the machine frame 3. The wheel cover 12 is configured to be not closed contiguously merely in those regions in which either a neighboring chassis unit 11 or the machine frame 3, in particular the wheel side 19 of the machine frame 3, ensure a corresponding thermal insulation of the chassis units 11 relative to the external environment. As an alternative to the embodiment shown, it is of course also possible to form the wheel cover 12 in such a way that it completely encloses the front chassis portion 5 or the respective chassis unit 11.

As also becomes clear from FIG. 4, for example, the wheel cover 12 or each wheel cover unit 18 comprises a recess 21, through which the support column 9 of the respective chassis unit 11 extends to the machine frame 3.

The steering axis L, about which the chassis unit 11 are supported to be rotatable upon a cornering of the ground compaction machine 1, also runs inside the support column 9. Further preferably, the chassis units 11 can be swung about a respective horizontal pendulum axis, and the chassis portions 5 and 6 can in turn be swung about a pendulum axis.

Figure 5:
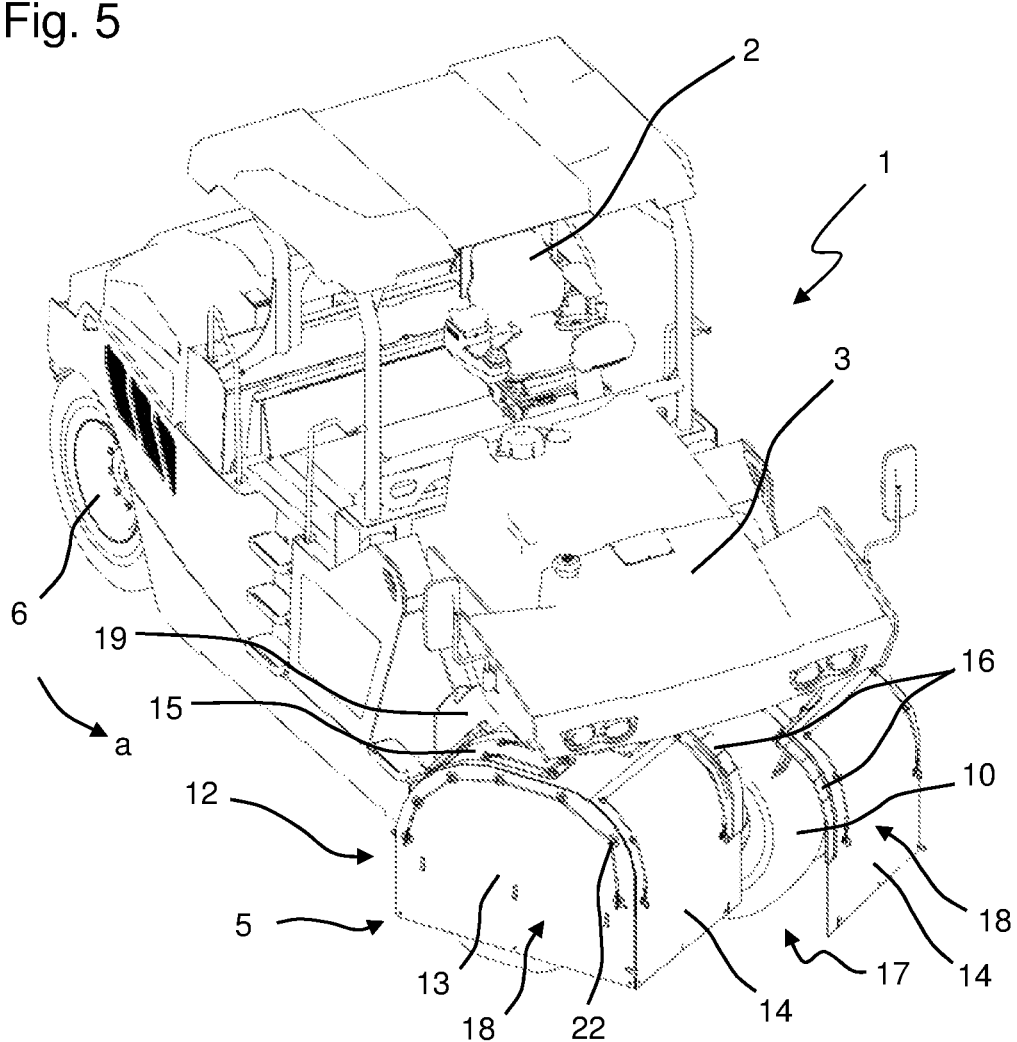
FIG. 5 is a perspective view of the ground compaction machine of FIG. 3 when cornering to the left.
Figure 6:
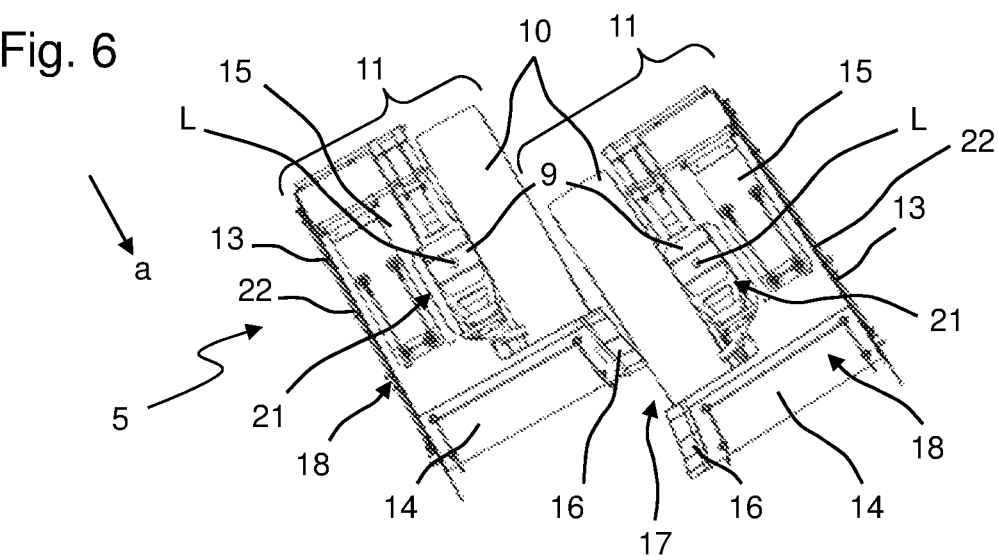
FIG. 6 is a top view of the front chassis portion of the ground compaction machine according to FIG. 5.
Figure 7:
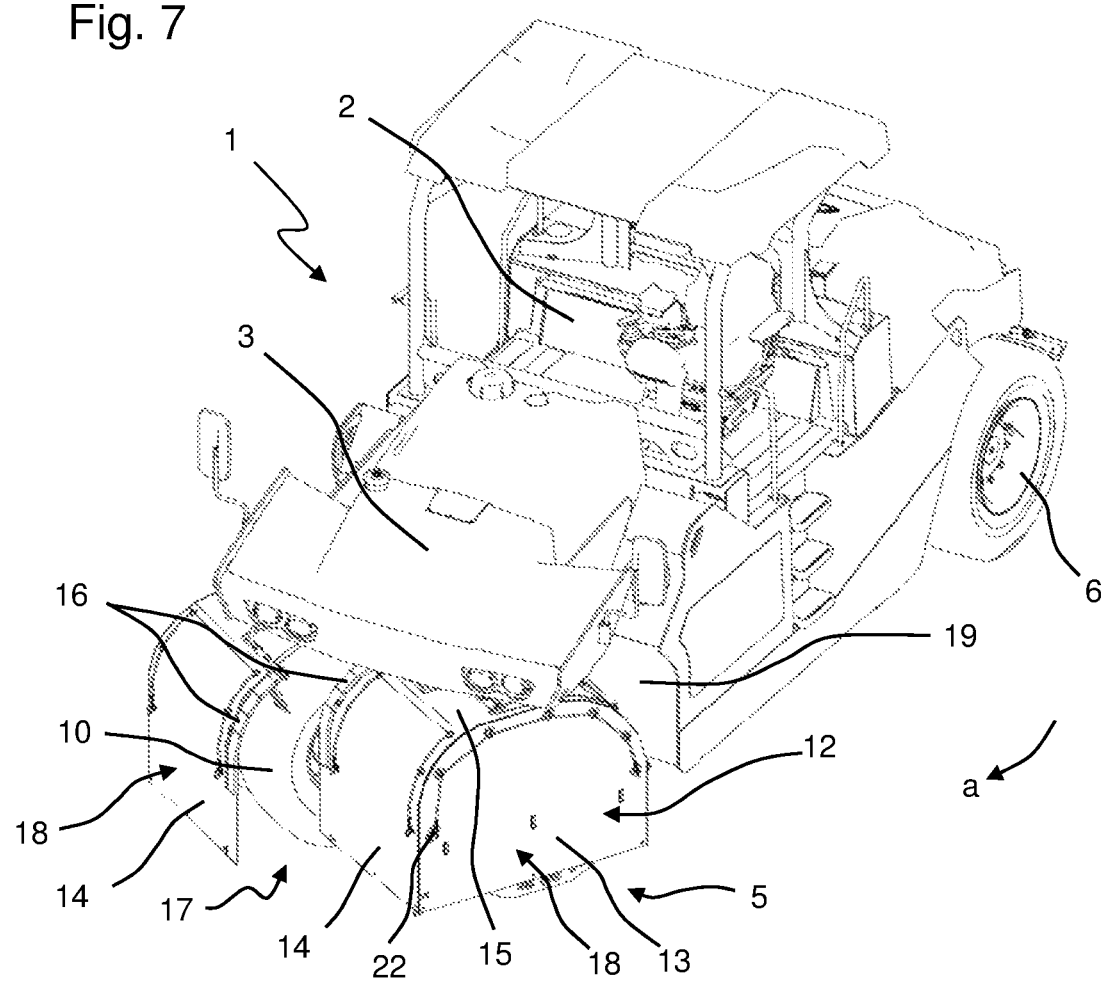
FIG. 7 is a perspective view of the ground compaction machine of FIG. 3 when cornering to the right.
Figure 8:
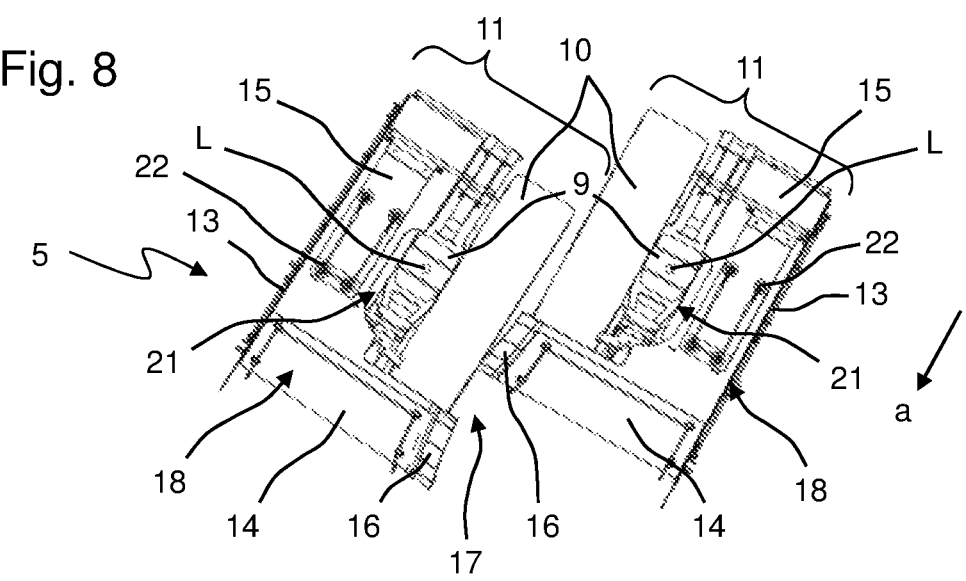
FIG. 8 is a top view of the front chassis portion of the ground compaction machine according to FIG. 7.

The situation in a left turn of the ground compaction machine is illustrated in FIGS. 5 and 6, the situation in a right turn in FIGS. 7 and 8. In particular, it becomes apparent that in contrast to a cornering compared to straight-line motion, a gap 17 opens between the wheel cover units 18, i.e., the front skirts 14 of the wheel cover units 18, which is closed during straight-line motion, as illustrated in FIGS. 3 and 4. Draft air from the external environment may enter through this gap 17 to the wheels of the chassis units 11 and lead to a loss of heat there. However, due to the fact that cornering constitutes only a small part of the working mode of the rubber-tired roller or the ground compaction machine 1, said loss of heat, which is extremely small, is acceptable. In order to minimize the heat loss nevertheless, sealing elements 16 are provided at the front skirts 14, which are arranged on the sides of the front skirts 14 which are oriented to a neighboring wheel chassis unit 11 or to a neighboring front skirt 14 of a wheel cover unit 18. The sealing elements 16, such as brushes, for example, are configured in such a way that they completely close the gap 17 when the ground compaction machine 1 is in straight-line motion (see FIGS. 3 and 4). To that end, the sealing elements 16 rest against one another or overlap or engage one another so as to close the gap 17.

At the same time, the sealing elements 16 are designed in such a way that they in each case rest against a wheel of the neighboring wheel chassis unit 11 and/or slide along said unit upon cornering of the ground compaction machine 1 (see FIGS. 5 to 8). This way, draft entering the inner areas of the wheel chassis units 11 from the external environment via the gap 17 during cornering of the ground compaction machine 1 is held as small as possible. An alternative embodiment of the wheel cover 12 of the present invention provides for lateral skirts 13 to be arranged also on those sides of the wheel chassis units 11 which are arranged adjacent to another wheel chassis unit 11, so that the respective wheel cover unit 18, in particular together with the machine frame 3, or the wheel side 19 of the machine frame 3, completely encloses the respective wheel chassis unit 11. In this embodiment, the wheel cover unit 1218 is thus configured to enclose the wheel chassis unit 11 completely also on the side on which the wheel chassis unit 11 adjoins another wheel chassis unit 11. In this way, although the developing gap 17 cannot be avoided during cornering of the ground compaction machine 1, draft entering from the external environment will not reach the wheels 10 of the wheel chassis unit 11 in an unobstructed manner, resulting in less heat exchange between the wheels 10 and the external environment.

Figure 9:
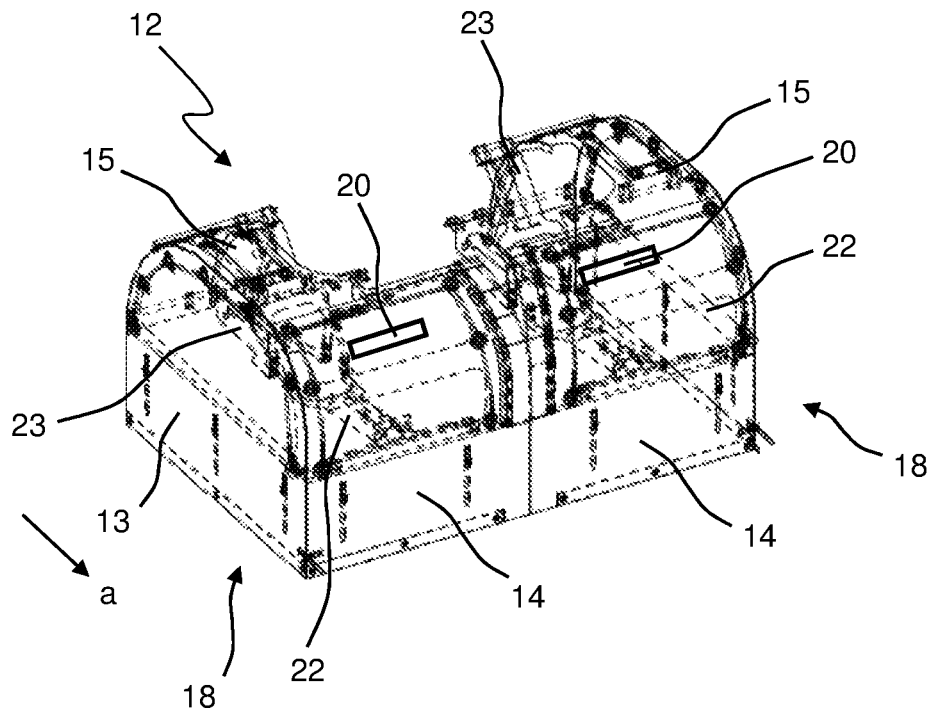
FIG. 9 is a perspective view of a wheel cover during straight-line motion according to FIG. 3.
Figure 10:
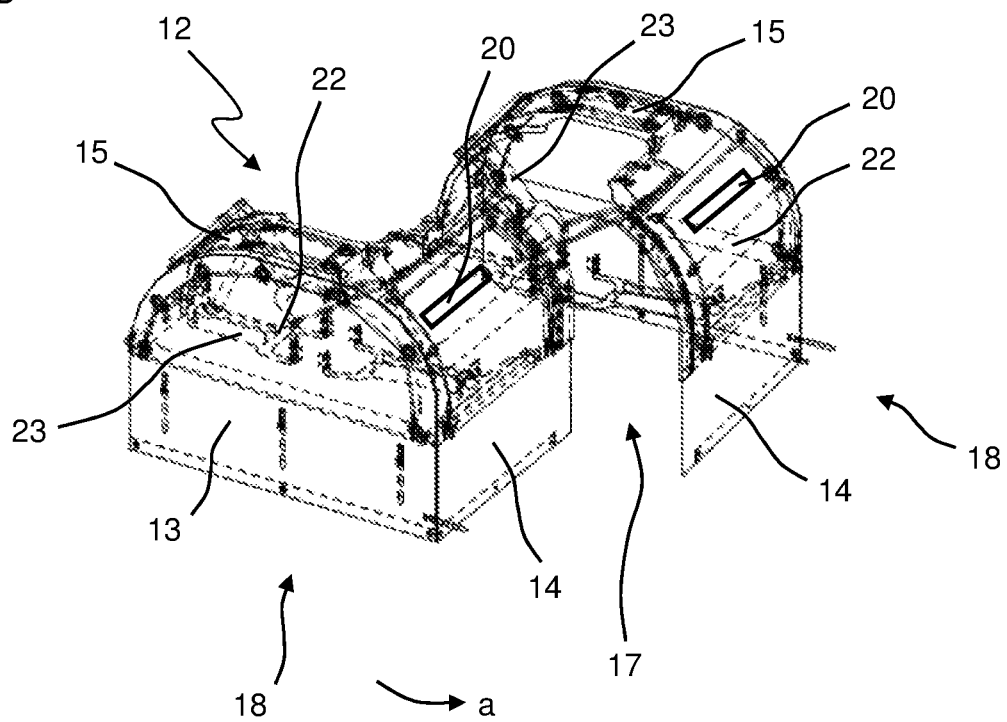
FIG. 10 is a perspective view of a wheel cover during cornering to the left according to FIG. 5.

FIGS. 9 and 10 each only show the wheel cover 12 during straight-line motion and cornering. The lateral skirts 13, the front skirt 14 and the hood 15 are each fixed to a mounting frame 22. In turn, the mounting frame 22 is configured for fastening to a support column 9 (not illustrated in FIGS. 9 and 10). To that end, the mounting frame 22 comprises a total of four support bars 23, which are arranged between the two wheels 10 of the wheel chassis unit 11 and span the inner space of the wheel cover unit 18. Each of the support bars 23 is configured to be mountable with one of its ends to the support column 9 and therefore on the mobile part of the support axle of the wheel chassis unit 11. Mounting is effected, for example, by means of a fast coupling system, so that the wheel cover 12 as a whole is designed to be retrofittable to a ground compaction machine 1. In addition, a stripping device 20 is arranged on the wheel cover 12, which is configured to strip-off ground material adhering to the running surface of the wheels 10. By arranging the stripping device 20 on the wheel cover unit 18 or the mounting frame 22 of the wheel cover unit 18, an additional mounting unit for the stripping device 20 can be dispensed with, allowing the entire configuration of the wheel cover unit 18 according to the invention to be particularly simple, compact and cost-effective. As an alternative or in addition, reference numeral 20 may as well denote brushes, coco mats and/or parts of a sprinkling system, such as specifically spray bars or individual nozzles, which can be arranged on the wheel cover units 18 and in particular on the mounting frame 22 as a support structure.

What is claimed is:

1. A ground compaction machine for compacting a ground in a working direction, comprising:
    a machine frame;
    a chassis supporting the machine frame, the chassis comprising a plurality of chassis portions including a front chassis portion and a rear chassis portion, each of the plurality of chassis portions further comprising at least two chassis units, each one of the at least two chassis units including at least one wheel and being rotatable about a distinct steering axis; and
    a wheel cover configured to thermally insulate each of the at least two chassis units from the external surroundings, wherein the wheel cover includes at least two wheel cover units each of the respective wheel cover units being arranged on each of the at least two chassis units, said wheel cover unit being configured to be rotatable together with the respective chassis unit about the respective distinct steering axis.

2. The ground compaction machine according to claim 1, wherein each wheel cover unit comprises a front skirt, a hood, and a lateral skirt.

3. The ground compaction machine according to claim 2, wherein at least two of: the front skirt, the lateral skirt, and the hood are formed as one piece.

4. The ground compaction machine according to claim 2, wherein the hood is configured to be adjustable from a cover position, in which it covers at least one rubber tire, to an open position, or includes a sight flap adjustable between a cover position and an open position.

5. The ground compaction machine according to claim 2, wherein the wheel cover unit further comprises at least one sealing element, in particular on the front skirt, said sealing element being configured in such a way that it rests against a sealing element of an adjacent wheel cover unit or overlaps with the sealing element of the adjacent wheel cover unit during straight-line motion of the ground compaction machine, so that a gap between two adjacent wheel cover units is closed.

6. The ground compaction machine according to claim 5, wherein the sealing elements each include a brush.

7. The ground compaction machine according to claim 5, wherein the sealing elements are configured in such a way that the at least one sealing element slides along or rests against a wheel of a neighboring wheel cover unit in the gap between two adjacent wheel cover units during cornering of the ground compaction machine.

8. The ground compaction machine according to claim 2, wherein each of the wheel cover units comprises a recess, in particular in the hood, through which a support column of the chassis unit is connected with the machine frame.

9. The ground compaction machine according to claim 2, wherein the wheel cover unit comprises a mounting frame arranged on the chassis unit, and to which the front skirt, the hood, and the lateral skirt can be fastened.

10. The ground compaction machine according to claim 9, wherein each of the at least two wheel cover units and the mounting frame of each of the at least two wheel cover units serve as a support structure for further elements including one or more of brushes, coco-mats, parts of a sprinkling system such as specifically spraying beams or individualized nozzles, and a stripping device, which is configured to strip off ground material adhering to the at least one wheel of each of the at least two chassis units.

11. The ground compaction machine according to claim 1, wherein each one of the at least two chassis units comprises exactly two wheels.

12. The wheel cover of the ground compaction machine according to claim 1, comprising at least one of the following features:
- a mounting frame;
- a front skirt, a hood and a lateral skirt and is formed to be open on the side opposite the lateral skirt, wherein at least two of the front skirt, the lateral skirt, or the hood are formed as one integral piece;
- a front skirt, a hood and a lateral skirt and is formed to be open on the side opposite the lateral skirt, wherein at least one sealing element on the face side opposite the lateral skirt;
- a holding device, by means of which it can be fixed to the ground compaction machine, in particular to a chassis unit; or
- a recess for guiding a support column therethrough.

* * * * *